(12) United States Patent
Kaler et al.

(10) Patent No.: US 7,853,695 B2
(45) Date of Patent: Dec. 14, 2010

(54) USING EXPRESSIVE SESSION INFORMATION TO REPRESENT COMMUNICATION SESSIONS IN A DISTRIBUTED SYSTEM

(75) Inventors: Christopher G. Kaler, Sammamish, WA (US); David E. Langworthy, Kirkland, WA (US); John P. Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1265 days.

(21) Appl. No.: 10/371,845

(22) Filed: Feb. 21, 2003

(65) Prior Publication Data
US 2004/0199586 A1   Oct. 7, 2004

(51) Int. Cl.
*G06F 15/16* (2006.01)
(52) U.S. Cl. .................. 709/227; 709/206; 709/207; 709/201
(58) Field of Classification Search .......... 709/227, 709/206, 207, 201
See application file for complete search history.

(56) References Cited

U.S. PATENT DOCUMENTS

| | | | | |
|---|---|---|---|---|
| 5,493,668 A | * | 2/1996 | Elko et al. | 711/130 |
| 5,517,662 A | * | 5/1996 | Coleman et al. | 709/201 |
| 6,697,942 B1 | * | 2/2004 | L'Heureux et al. | 713/152 |
| 2003/0014477 A1 | * | 1/2003 | Oppenheimer et al. | 709/203 |
| 2003/0045311 A1 | * | 3/2003 | Larikka et al. | 455/466 |
| 2003/0055903 A1 | * | 3/2003 | Freed | 709/206 |
| 2003/0074413 A1 | * | 4/2003 | Nielsen et al. | 709/206 |
| 2003/0204677 A1 | * | 10/2003 | Bergsten | 711/144 |
| 2006/0123447 A1 | * | 6/2006 | Westlake et al. | 725/40 |
| 2006/0265689 A1 | * | 11/2006 | Kuznetsov et al. | 717/117 |

* cited by examiner

*Primary Examiner*—Barbara N Burgess
(74) *Attorney, Agent, or Firm*—Workman Nydegger

(57) ABSTRACT

A message processor accesses an electronic message. The accessing message processor identifies, from within the electronic message, any communication session information associated with the accessing message processor. This can include identifying expressive XML instructions or XML data structures representing communication sessions or message sequences. The accessing message processor determines if any session information within the electronic message is to be modified. This can include inserting session information for new sessions or message sequences, updating existing session information, or removing session information for terminated or expired communication sessions or message sequences. The accessing message processor then routes the electronic message to another message processor. In some embodiments, an initiating message processor identifies cached session information that is used to initially establish a communication session. The identified session information is included in a session element that is routed to one or more receiving message processors.

32 Claims, 5 Drawing Sheets

USING EXPRESSIVE SESSION INFORMATION TO REPRESENT COMMUNICATION SESSIONS IN A DISTRIBUTED SYSTEM

BACKGROUND OF THE INVENTION

1. The Field of the Invention

The present invention relates to communication sessions, and more specifically, to using expressive session information to represent communication sessions in a distributed system.

2. Background and Relevant Art

Computer networks have enhanced our ability to communicate and access information by allowing one computer or device (hereinafter both referred to as a "computing system") to communicate over a network with another computing system using electronic messages. When transferring an electronic message between computing systems, the electronic message will often pass through a protocol stack that performs operations on the data within the electronic message (e.g., packetizing, routing, flow control). The Open System Interconnect ("OSI") model is an example of a networking framework for implementing a protocol stack.

OSI model breaks down the operations for transferring an electronic message into seven distinct "layers," each designated to perform certain operations in the data transfer process. While protocol stacks can potentially implement each of the layers, many protocol stacks implement only selective layers for use in transferring data across a network. When data is transmitted from a computing system, it originates at the application layer and is passed down to intermediate lower layers and then onto a network. When data is received from a network it enters the physical layer and is passed up to higher intermediate layers and then eventually received at the application layer. The application layer, the upper most layer, is responsible for supporting applications and end-user processes. Another layer incorporated by most protocol stacks is the transport layer. An example of a transport layer protocol is the Transmission Control Protocol ("TCP").

Often, when two computing systems desire to communicate with each other, for example, by transferring a number of electronic messages, the two computing systems will establish a communication session. To initiate the establishment of a communication session the two computing systems can exchange session options, such as, for example, a protocol, a session identifier (typically an integer value), and session semantics (e.g., data formats), that are subsequently used when transferring of electronic messages. Depending on the type of electronic message that is to be transferred, a communication session utilizing a particular protocol can be established. For example, when transferring an electronic mail message a Simple Mail Transfer Protocol ("SMTP") communication session can be established. On the other hand, when transferring a Web page a HyperText Transfer Protocol ("HTTP") session can be established.

To facilitate the exchange of session options, the two computing systems may participate in a handshake sequence as prescribed by a particular protocol that will be used to transfer electronic messages. For example, when a Session Initiation Protocol ("SIP") communication session is to be established, the two computing systems may perform a SIP handshake sequence to exchange session options. Typically, handshake sequences for establishing a communication session are hard-coded, or "built into," each protocol and include limited, if any, functionality to alter how session options are exchanged. Thus, an application designer may have no way to design an application layer process such that communication options can be exchanged in a way that differs from a hard-coded handshake sequence. This is unfortunate as the application designer is often in a better position to decide how a communication options should be exchanged for an application layer process.

Application layer processes can also be prevented from altering handshake sequences (in part due to the configuration of protocol stacks) used to establish communication sessions because these handshake sequences often operate at lower layers of a protocol stack. Application layer processes are typically not designed (or configured) to alter functionality at lower layers of a protocol stack. Thus, even for handshake sequences that are somewhat configurable, an application layer process may still be prevented from altering handshake sequence functionality. For example, a Web browser may have no way to access or control the selection of a TCP session identifier. Further, even if the Web browser were to access the TCP session identifier, the TCP session identifier would have little, if any, meaning to the Web browser.

It may be that an application designer desires for a particular distributed application to always establish TCP communication sessions with a particular session identifier value (e.g., "1"). Alternately, it may be that the application designer desires for the particular distributed application to represent communication sessions through a session identifier that is more expressive than an integer value. Unfortunately, the application designer would typically be prevented from implementing either of these functionalities since TCP operates at the transport layer (and thus is below the application layer).

Further, many protocols used to establish communication sessions are point-to-point protocols that permit establishment of a communication session only between two connected points. However, these same protocols do not permit communication sessions to be directly established between two computing systems that are separated by intermediaries, such as, for example, by a number of intermediary computing systems in a routing path. Thus, multiple communication sessions may need to be established to facilitate the transfer of an electronic message between two computing systems that are not directly connected.

FIG. 6 is a prior art Figure illustrating client 601, intermediary 605, and server 602. In FIG. 6, communication session 612 can be established between client 601 and intermediary 605 based on communication options that are exchanged between client 601 and intermediary 605. Likewise, communication session 613 can be established between intermediary 605 and server 602 based on communication options that are exchanged between intermediary 605 and server 602. It may be that the communication options exchanged between client 601 and intermediary 605 differ from the communication options exchanged between intermediary 605 and server 602. Thus, the session identifiers and session semantics of communication session 612 and 613 can differ. This can lead to processing inefficiencies when an electronic message is sent from client 601 to server 602.

Intermediary 605 may be required to maintain communication options (e.g., session identifiers) for both communication session 612 and communication session 613 and be able to compatibly translate between the differing communication options. Thus, when an electronic message is transferred from client 601, through intermediary 605, to server 602, intermediary 605 may expend resources translating the electronic message even though intermediary 605 is not the ultimate recipient of the electronic message. Further, even if the communication options of communication session 612 and communication session 613 are similar (or perhaps even identical), intermediary 605 may still be required to expend resources to establish and maintain two communication sessions.

Therefore systems, methods, computer program products, and data structures for using expressive session information to represent communication sessions would be advantageous.

BRIEF SUMMARY OF THE INVENTION

The foregoing problems with the prior state of the art are overcome by the principles of the present invention, which are directed towards methods, systems, computer program products, and data structures for using expressive session information to represent communication sessions. A distributed system includes a number of message processors that can route electronic messages. An application layer process at an accessing message processor (e.g., an initiating message processor, an intermediary message processor, or a destination message processor) accesses an electronic message. This can include accessing a header or body portion of a Simple Object Access Protocol ("SOAP") envelope that contains session information represented by one or more eXtensible Markup Language ("XML") instructions.

Accordingly, the application layer process identifies (from within the electronic message) any session information associated with the accessing message processor. This can include identifying session identifiers and/or message sequences that are associated with the accessing message processor. Since an application layer process identifies session information (as opposed to identification at other lower layers in a communication stack), an application designer has increased control over how communication options (e.g., session identifiers and session semantics) are expressed. For example, communication sessions and message sequences can be represented by XML data structures. When an XML schema is used to constrain the meaning of data types in the XML data structure, an application designer has increased flexibility to define (or even re-define) how session information is expressed.

The accessing message processor determines if any session information should be updated. This can include adding session information to (e.g., in response to a query from another message processor), removing session information from (e.g., when session information is targeted only to the accessing message processor), and/or altering session information contained in the electronic message. Session information can also be retrieved from the electronic message and cached at the accessing message processor (or at some other accessible location) to facilitate the appropriate processing of subsequently received electronic messages. For example, cached session information can be utilized to determine the accessing message processor is associated with a communication session and/or message sequence represented in a subsequently received electronic message.

After processing the electronic message, the application layer routes the electronic message to another message processor in the distributed system. This can include routing the electronic message through one or more intermediary message processors to a destination message processor. Since session information is maintained at the application layer, end-to-end communication sessions (e.g., between the accessing message processor and the destination message processor) can be established.

In some embodiments, an initiating message processor initiates the establishment of a communication session with one or more other message processors. The initiating message processor identifies session information for establishing a communication session with one or more receiving message processors. Likewise, the one or more other message processors can each identify session information for establishing a communication session with the initiating message processor. Session information identified at the initiating message processor and/or at the one or more other messages processors can be utilized to generate communication options, such as, for example, session identifiers and message sequences representing a communication session.

An initiating application layer at the initiating message processor includes the session information in a session element that can be processed at corresponding receiving application layers at each of the one or more receiving message processors. This can include representing the session information in an XML data structure. The initiating message processor routes the session element, such as, for example, by including the session element in a SOAP envelope, to the one or more receiving message processors.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
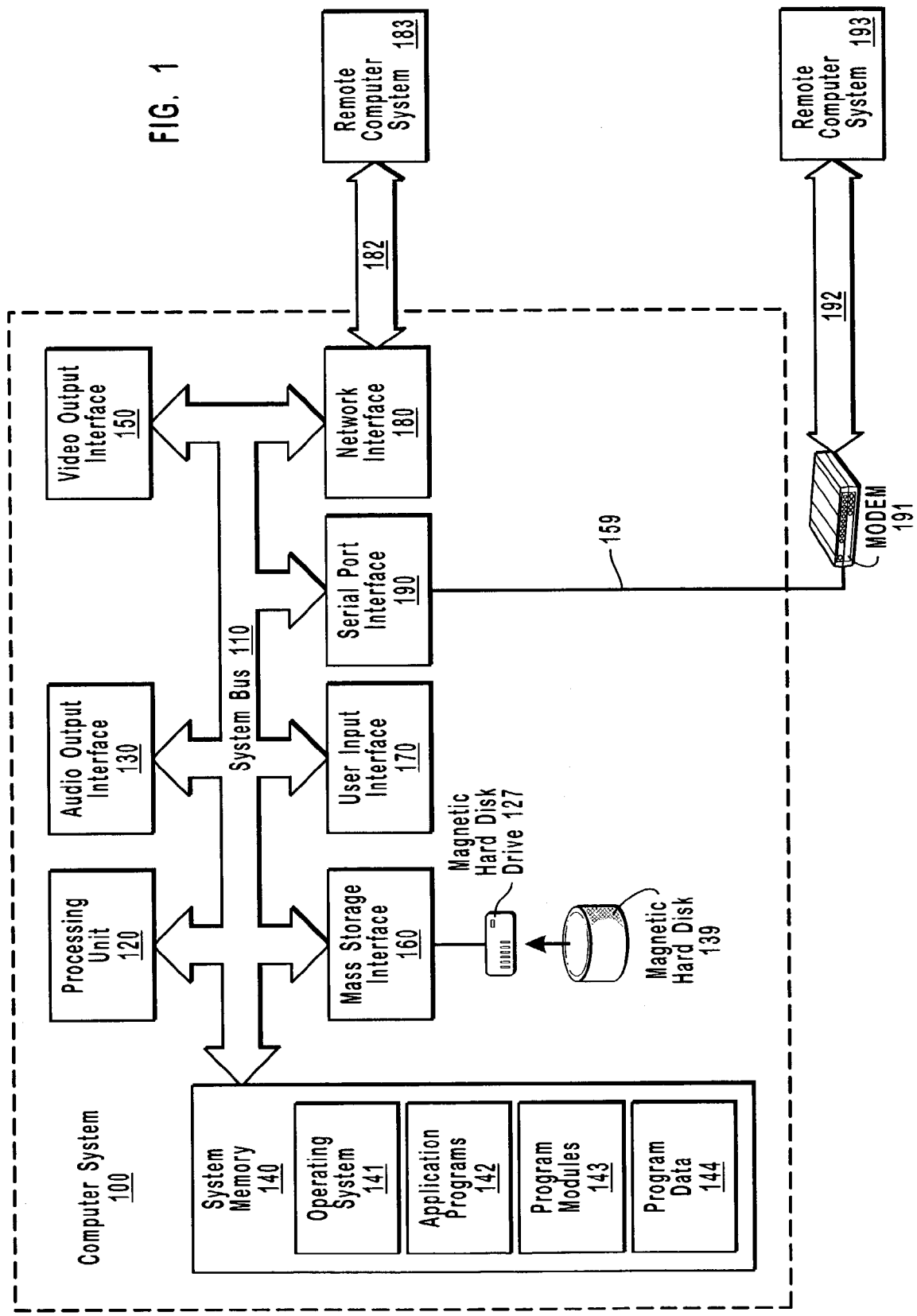
FIG. 1 illustrates a suitable operating environment for the principles of the present invention.

The principles of the present invention provide for using expressive session information to represent communication sessions in a distributed system. An application layer at an accessing message processor accessing an electronic message. Session information associated with the accessing message processor is identified from within the electronic message. This can include identifying XML instructions or XML data structures that represent sessions or message sequences associated with the accessing message processor. When a session or message sequence associated with the accessing message processor is identified (e.g., by comparing session information from within the electronic message to cached session information), the electronic message can be delivered to an application layer process at the access message processor (e.g., a first portion of a distributed application).

The accessing message processor determines if any session information within the electronic message is to be modified. The accessing message processor can modify session information by inserting new session information into the message (e.g., to respond to a query from another message processor or establish a new session), remove session information from the message (e.g., when a session has expired), or change the value of session information. Session information contained in the electronic message can also be cached at the accessing message processor (or at some other accessible location) to facilitate the appropriate processing of subsequently received electronic messages. The application layer then routes the electronic message to another message processor in the distributed system (e.g., to a second portion of the distributed application).

In some embodiments, an initiating message processor initiates the establishment of a communication session with one or more other message processors. The initiating message processor identifies session information for establishing a communication session with one or more receiving message processors. This can include identifying communication options, such as, for example, a session identifier and message sequences that will represent the communication session. An initiating application layer at the initiating message processor includes the session information in a session element that can be processed by corresponding receiving application layers at each of the one or more receiving message processors. The initiating message processor routes the session element, such as, for example, by including the session element in a SOAP envelope, to the one or more receiving message processors.

Embodiments within the scope of the present invention include computer-readable media for carrying or having computer-executable instructions or data structures stored thereon. Such computer-readable media may be any available media, which is accessible by a general-purpose or special-purpose computer system. Computer-readable media can be divided into two categories physical storage media and communication media. Physical storage media includes RAM, ROM, EPROM, CD-ROM or other optical disk storage, magnetic disk storage or other magnetic storage devices. Physical storage media, however, does not include signals or carrier waves.

Communication media, on the other hand, includes signals and carrier waves. For example, when information is transferred or provided over a network or another communications connection (either hardwired, wireless, or a combination of hardwired or wireless) to a computer system, the connection is properly viewed as a communication medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "logical communication link" is defined as any communication path that enables the transport of electronic data between two entities such as computer systems, message processors, or modules. The actual physical representation of a communication path between two entities is not important and may change over time, such as, for example, when the routing path of an electronic message is changed. A logical communication link may include portions of a system bus, a local area network, a wide area network, the Internet, combinations thereof, or portions of any other path that facilitates the transport of electronic data. Logical communication links are defined to include hardwired links, wireless links, or a combination of hardwired links and wireless links. Logical communication links can also include software or hardware modules that condition or format portions of data so as to make the portions of data accessible to components that implement the principles of the present invention (e.g., proxies, routers, gateways, etc).

In this description and in the following claims, a "message processor" is defined as one or more modules (hardware and/or software) that operate together to perform messaging operations on electronic messages. Messaging operations include, for example, initiating a message, composing a message, accessing a message, appending information to a message, sending a message, receiving a message, routing a message, removing information from a message, and terminating a message. Any message processor can include the functionality to perform one or more of these messaging operations. It may be that the modules of a message processor are included within a general-purpose computer system, such as, for example, within a laptop or desktop computer system. On the other hand, it may also be that the modules of a message processor exist as a special-purpose computer system, such as, for example, a router.

In this description and in the following claims, "routing" is defined as sending, receiving, and/or determining where to send an electronic message. For example, a sending message processor may initiate an electronic message and include routing information within the electronic message (e.g., in a routing field of the electronic message) that indicates the electronic message is to be routed to a receiving message processor. An intermediary message processor that accesses the electronic message can determine, based on the included routing information, where to route the electronic message.

If appropriate, the intermediary message processor can route the electronic message directly to the receiving message processor. However, it may be that the intermediary message processor is not directly connected to the receiving message processor (or for some other reason can not directly communicate with the receiving message processor). Thus, it may be appropriate for the intermediary message processor to route the electronic message to a second intermediary message processor that is included in a routing path between the sending and receiving message processors. Based on information within an electronic message, an intermediary message processor can also modify routing information (e.g., by changing values in a routing field of an electronic message) included in an electronic message. It may be that a routing field is included along with other fields as part of a data structure associated with an electronic message.

In this description and in the following claims, a "schema" is defined as an expression of a shared vocabulary between a plurality of computer systems and/or a plurality of message processors that allows the plurality of computer systems and/or the plurality of message processors to process documents according to the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system or message processor that can access an XML schema can process XML documents in accordance with the XML schema. Further, any computer system or message processor that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actual file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema. In this definition and the following claims, "schema-based" refers to being defined by and/or in accordance with a schema.

In this description and the following claims, a "communications stack" is defined as a plurality of communication layers, including at least an application layer and one lower layer that is below the application layer, that interoperate to transfer data between message processors. Communication stack is defined to include protocol stacks based around the Open Systems Interconnection ("OSI") networking framework for implementing protocols, including protocol stacks that incorporate the functionality of a plurality of OSI layers in a single layer. Communications stack is further defined to include any protocol stacks implementing the Transmission Control Protocol ("TCP") and/or the Internet Protocol ("IP").

In this description and the following claims, "session information" is defined generally to include, but is not limited to, information used to represent characteristics of a communication session, such as, for example, session identifiers, session names, session priorities, message sequences, message sequence names, message sequence priorities, and message sequence values. Session information can be represented using virtually any types of values including, numeric values (e.g., 12, D4, 11001, etc.), characters of text (e.g., "c", "v", "6", etc.), strings of text (e.g., "06:45:33", "Delay=132 ms", etc.), or user-defined values. The definition of session information is further defined to include signed and/or encrypted session information (or portions thereof), such as, for example, session information that is encrypted for a particular recipient.

In this description an in the following claims, a "session element" is defined generally to include an expressive representation of one or more portions of session information. It may be that each portion of session information is maintained in a field of data structure (e.g., an XML data structure).

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 1, a suitable operating environment for the principles of the invention includes a general-purpose computer system in the form of a computer system 100. Computer system 100 may be, for example, a personal computer that has been adapted to perform the operations disclosed herein.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 includes video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules, and other data for computer system 100. For example, magnetic hard disk 139 can store one or more program modules including operating system 141, application programs 142, other program modules 143, and program data 144.

Computer system 100 is connectable to networks, such as, for example, an office-wide or enterprise-wide computer network, an intranet, and/or the Internet. Computer system 100 can exchange data with external sources, such as, for example, remote computer systems, remote message processors, and/or remote databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 may be an initiating message processor or receiving message processor that is desirous of establishing a communication channel with computer system 100.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 may be an initiating message processor or receiving message processor that is desirous of establishing a communication channel with computer system 100.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules, distributed applications, and communication stacks as well as associated data, including electronic messages, session information, session elements, and schemas may be stored and accessed from any of the computer-readable media associated with computer system 100. For example, portions of such modules and portions of associated program data may be included in operating system 141, application programs 142, program modules 143 and/or program data 144, for storage in system memory 140.

It may be that different portions of the computer-readable media of computer system 120 are utilized to store different types of data. For example, a first portion of system memory 140 may be used to cache session information, while a second portion of system memory 140 is used to cache electronic messages. A message processor can cache session information for use by the message processor (local caching). On the other hand, a first message processor can cache session information for use by second message processor (remote caching). Session information within a cached electronic message can be moved from the electronic message cache to a session information cache. Likewise, session information within cached session information can be moved from a session information cache to a cached electronic message.

When a mass storage device, such as, for example, magnetic hard disk 139, is coupled to computer system 100, such modules and associated program data may also be stored in the mass storage device. In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
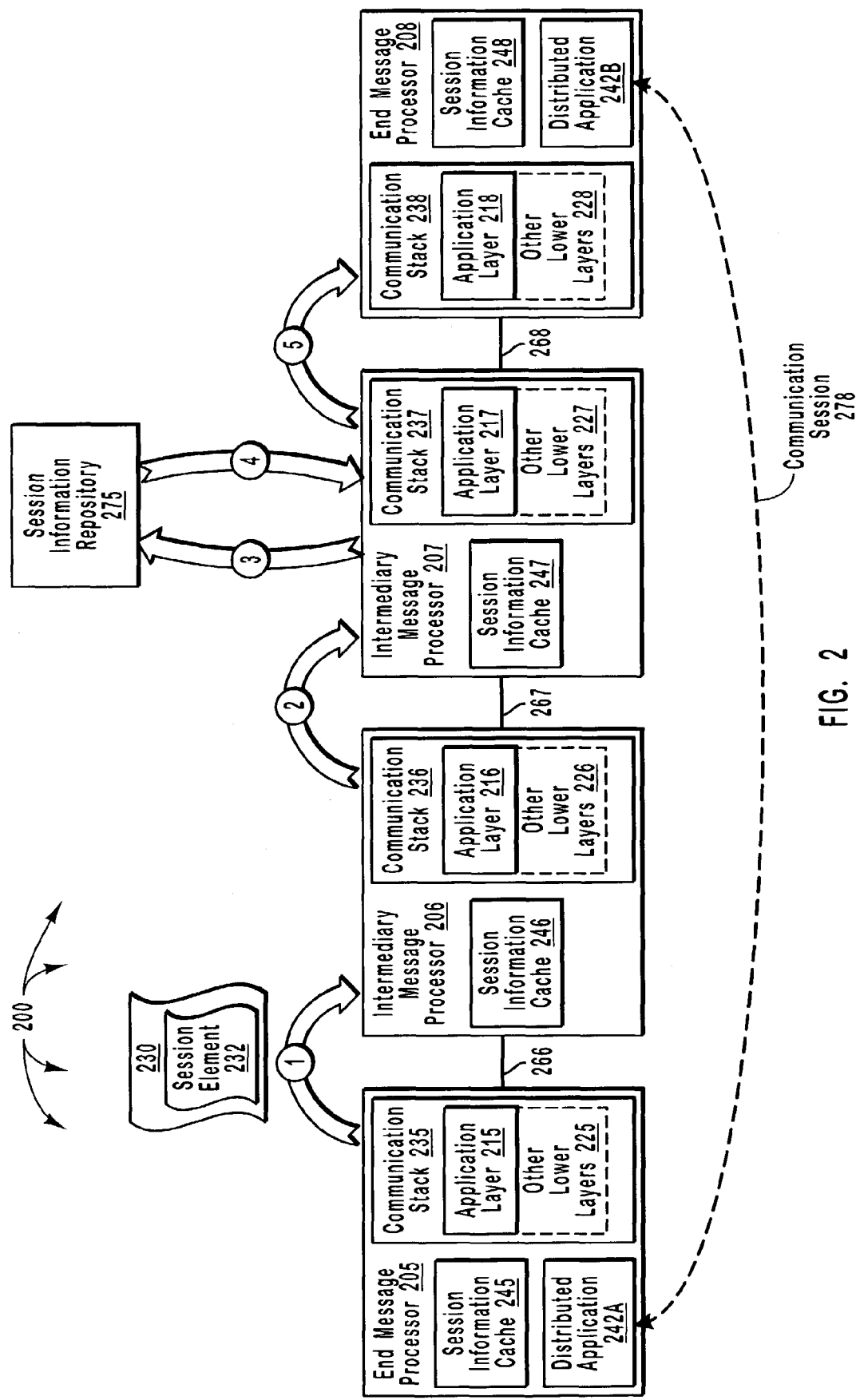
FIG. 2 illustrates an example of a network architecture that can facilitate using expressive session information to represent a communication session.

FIG. 2 illustrates an example of network architecture 200 that can facilitate using expressive session information to represent a communication session. Depicted in network architecture 200 are end message processor 205, intermediary message processors 206 and 207, and end message processor 208. Corresponding logical communication links 266, 267, and 268 connect the message processors depicted in network architecture 200. The message processors depicted in network architecture 200 each include a corresponding communication stack (communication stacks 235, 236, 237, and 238) that can facilitate the transfer of electronic messages and a corresponding session information cache (session information caches 245, 246, 247, and 248) that can store session information for communication sessions.

Message processors depicted in network architecture 200 can initiate electronic messages and route electronic messages to (or through) other message processors within network architecture 200 or other message processes external to network architecture 200 (not shown). For example, end message processor 205 may initiate electronic message 230 that is routed through intermediary message processors 206 and 207 and received at end message processor 208. However, message 230 can be routed along virtually any routing path, such as, for example, through one or more of the other message processors external to network architecture 200. Similarly, end message processor 208 can initiate an electronic message that is routed (along the same or a different routing path from which message 230 was routed) to end message processor 205.

It should be understood that an electronic message can be routed through a message processor without the message processor necessarily being aware of the complete contents of the electronic message. It may be that a message processor checks a routing field of an electronic message and routes the electronic message towards a destination message processor without accessing other contents of the electronic message. For example, it may be that intermediary message processor 206 receives electronic message 230. Intermediary message processor 206 can check a routing field in electronic message 230 and appropriate route electronic message 230 without accessing session element 232.

Figures 3, 4:
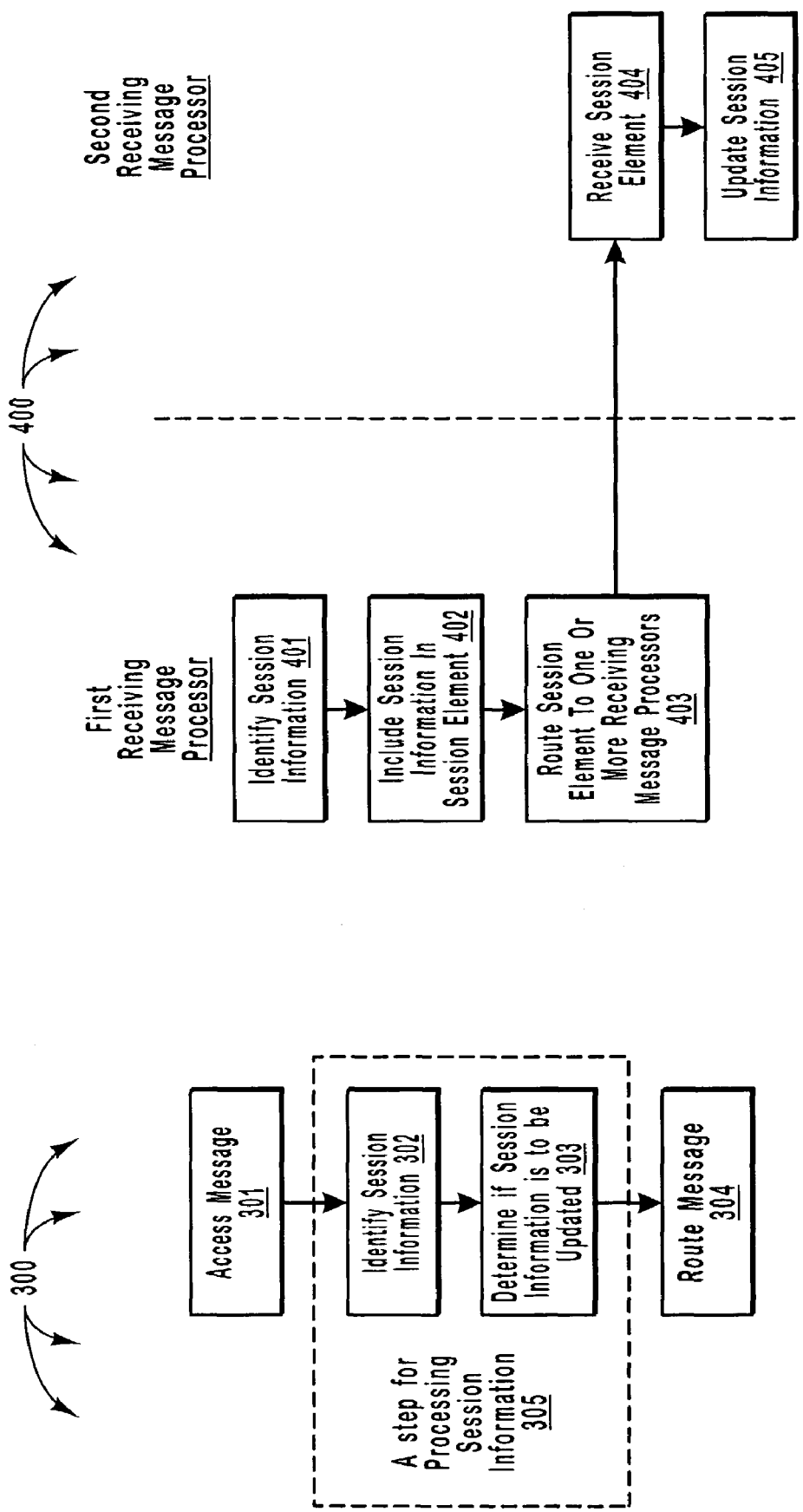
FIG. 3 illustrates an example flowchart of a method for using expressive session information to represent a communication session.
FIG. 4 illustrates an example flowchart of a method for using expressive session information to initiate a communication session.

FIG. 3 illustrates a flowchart of a method 300 for using expressive session information to represent a communication session. The method 300 will be described with respect to the message processors depicted in network architecture 200.

Method 300 includes an act of accessing a message (act 301). Act 301 can include an application layer at an accessing message processor accessing the electronic message. For example, application layer 216 or application layer 217 may access electronic message 230. It may be that a first application layer (e.g., application layer 215) initiates electronic message 230, which is to be received by a second application layer (e.g., application layer 218) such that an end-to-end communication session can be established. This can include establishing end-to-end communication session 278 between distributed application 242A and distributed application 242B.

End-to-end communication sessions can reduce, and possibly eliminate, the resources that are consumed at other lower layers 225, 226, 227, and 228 for maintaining multiple point-to-point communication sessions. Further, when application layer processes access session information, an application designer is not limited by constraints that may be inherent in establishing communication sessions at lower layers (e.g., other lower layers 225 through 228) of communication stacks. Thus, an application designer has increased flexibility to express session information in a desired manner.

Electronic message 230 can be routed along a routing path from end message processor 205 to end message processor 208. Intermediary message processors 206 and 207 may be message processors included in the routing path. As illustrated by arrow 1 in FIG. 2, end message processor 205 can transfer electronic message 230 to intermediary message processor 206. Electronic message 230 can subsequently be transferred to intermediary message processor 207 as illustrated by arrow 2 in FIG. 2 and arrive at end message processor 208 as illustrated by arrow 5 in FIG. 2.

Any of the message processors depicted in network architecture-200 can access electronic message 230 in accordance with the principles of the present invention. An accessed electronic message can include a session element (e.g., session element 232) that represents a communication session and one or more associated message sequences. In some embodiments, an accessed electronic message includes a plurality of session elements representing a plurality of communication sessions.

It should be understood that the present invention is not limited to messaging using any specific transport protocol and format. However, one example protocol that may be used to implement the principles of the present invention is called Simple Object Access Protocol ("SOAP"). Electronic message 230 may be a SOAP message that uses any number of lower level protocols, such as, for example, HyperText Transfer Protocol ("HTTP") or Direct Internet Message Encapsulation ("DIME") as a transport. The following represents an example XML session element that may be included in the header and/or body of a SOAP envelope for expressively representing session information:

```
1.  <Session>
2.      <SessionID URI="http://www.test.com/sessions/1234/">
3.      <Sequence>
4.          <Name>SubStreamA</Name>
5.          <Value>23</Value>
6.      </Sequence>
7.      <Sequence>
8.          <Name>
9.              <Priority>1</Priority>
10.         </Name>
11.         <Value>
12.             <To>Recipient5</To>
13.         </Value>
14.     </Sequence>
15. </Session>
```

The sub-elements within the example XML session element (i.e., between <Session> and </Session>) can include one more free-form XML documents. Likewise, the sub-elements within the example XML session element can include one or more XML documents that are defined in accordance with an XML schema accessible to the message processors depicted in network architecture 200. When a schema (e.g., an XML schema) is used to constrain the meaning of data types in a data structure (e.g., an XML data structure), an application designer has increased flexibility to define (or even re-Define) how session information is expressed.

The example XML session element includes two sequence sub-elements (one at lines 3-6 and another at lines 7-14). However, inclusion of both of these sub-elements within a SOAP envelope (or any other electronic message) is optional. These sub-elements are included merely to illustrate one example of some of the sub-elements that can be included in an electronic message to implement the principles of the present invention. Depending on the desired functionality one or more sequence sub-elements can be included in an electronic message. Further, it would be apparent to one skilled in the art, after having reviewed this description, that a wide variety of other sub-elements, in addition to the illustrated sub-elements, can be used to implement the principles of the present invention. Likewise, a plurality of XML session elements, in additional to the example XML session element can be included in a SOAP envelope (or any other type of electronic message).

In some embodiments, the example XML session element is included in the header portion of an electronic message, while application data (e.g., application data being transferred between distributed application 242A and distributed application 242B) is included in the body portion of the electronic message. It may also be that one or more name-value pairs, such as, for example, attributes and corresponding attribute values, represent portions of session information. For example, lines 3-6 of the example XML session element can alternately be represented by the tag <Sequence Name="SubStreamA" Value="23">, where Name and Value are attributes and SubStreamA and 23 are corresponding attribute values.

The SessionID tag at line 2 represents a session identifier. In the example XML session element, the represented session identifier is a Uniform Resources Identifier ("URI") that identifies a resource. The resource identified by the URI can be a common resource that is accessible to the message processors depicted in network architecture 200. The identified resource can contain cached session information that is used by the message processors in network architecture 200. Cached session information can be used to facilitate the exchange of application data between message processors included in a session or to increase the likelihood of reliable transferring electronic messages. Although represented in the example XML session element by URI, a session identifier can be represented by any structured (e.g., schema-based), semi-structured, or even unstructured data (e.g., plain text).

The Sequence sub-element at lines 3-6 is a first example of a sub-element that can be used to represent a message sequence. The Name tag at line 4 represents a descriptive name of "SubStreamA" for the Sequence sub-element. The descriptive name SubStreamA can identify a message sequence that is utilized by one or more message processors depicted in network architecture 200. The Value tag at line 5 represents a sequence number of "23" for the Sequence sub-element. The Value 23 can indicate that the electronic message containing the example XML session element is the 23$^{rd}$ message in the message sequence SubStreamA. Similar to a session identifier, a name can be represented by any structured, semi-structured, or even unstructured data.

The sequence sub-element at lines 7-14 is a second example of a sub-element that can be used to represent a message sequence. The Priority tag at line 8 represents a message priority of "1". It may be that a range of values (either numeric or of some other data type), such as, for example, 1, 2, 3, 4, 5, is used to indicate messages of varied priorities. A message priority of 1 may indicate that an electronic message containing the example XML session element is of a higher priority (than messages of priority 2 through 5) and should be processed before other messages in a message sequence. On the other hand, a message priority of 1 may indicate that an electronic message containing the example XML session element is of a lower priority (than messages of priority 2 through 5) and should be processed after other messages in a message sequence. A specified message sequence, for example, a "Priority1" message sequence, can be associated with messages having a message priority of 1. The To tag at line 12 represents that the specific recipient "Recipient5" is to receive the electronic message that contains the example XML session element.

Accordingly, more expressive sequence information, including structured names, can be associated with a message sequence. Expressive sequence information can include arbitrary sequence specific attributes and annotations describing a message sequence. Through the use of schemas and/or previously exchanged electronic messages, message processors can also exchange the meanings of the arbitrary attributes and annotations. Thus, application layer processes (e.g., distributed applications 242A and 242B) can represent expressive message sequences in a manner that is independent of communication at lower layers in a communication stack (e.g., other lower layers 226 and 228).

Returning to FIG. 3, the method 300 includes a functional, result-oriented step for processing session information (step 305). Step 305 may include any corresponding acts for processing session information. However, in the illustrated example of FIG. 3, the step 305 includes a corresponding act of identifying session information (act 302). Act 302 can include identifying from within an electronic message any session information associated with the accessing message processor.

It may be that after a message processor receives an electronic message (e.g., electronic message 230) containing a session element (e.g., session element 232), the message processor temporarily stores the electronic message in an electronic message cache. The message processor can then access the electronic message containing the session element to determine if the message processor is associated with any message sequences included in the electronic message. For example, intermediary message processor 207 may receive an electronic message containing the example XML session element and determine if Recipient5 accesses electronic messages at intermediary message processor 207. A recipient may be an individual, a portion of a distributed application, a message processor, or a computer system. If session information is structured session information, intermediary message processor may refer to a common schema to determine the structure of session information within a session element.

Session information contained in an electronic message can be associated with a message processor when cached session information indicates that a message processor receives messages for a message sequence. For example, message processor 206 may be configured to receive messages for message sequence SubStreamA as represented in the example XML Session element. As such, session information indicating end message processor 206's association with SubStreamA can be cached (along with associations for other message sequences) in session information cache 246. When an electronic message (e.g., electronic message 230) is received at message processor 206, message processor 206 can determine if the electronic message is associated with SubStreamA. This determination can be made, for example, by determining if any Name tags in the electronic message represent SubStreamA.

If an electronic message is directed to a specified recipient (e.g., by including a Target attribute and an appropriate corresponding attribute value), a message processor can determine if the recipient is associated with the message processor. For example, end message processor 208 may determine that it is to receive messages directed to distributed application 242B. Thus, when an electronic message includes a message sequence associated with distributed application 242B, end message processor 208 can transfer application data from the electronic message to distributed application 242B. When it is desirable to increase security associated with sending an electronic message to distributed application 242B, session information associated with distributed application 242B can be encrypted using a symmetric or one of a public/private key pair that is known to distributed application 242B. A key for encrypting session information can be received at the message processor out-of-band via other communication methods (i.e., outside the electronic messages used to exchange session information). In some embodiments, a symmetric key for a particular message processor is generated from a shared secret that is known to each message processor that will participate in a communication session.

When a message processor is unable to determine if session information in an electronic message is associated with the message processor, the message processor may query another message processor or a session information repository. For example, after receiving electronic message 230, intermediary message processor 207 may query session information cache 246 to determine if electronic message 230 is associated with intermediary message processor 207. Likewise, intermediary message processor 207 may query session information repository 275 to determine if electronic message 230 is associated with intermediary message processor 207.

As illustrated by arrow 3 in FIG. 2, intermediary message processor 207 sends a query to session information repository 275. This can include initiating an electronic message (e.g., a SOAP envelope) that includes the query and routing the electronic message to session information repository 275. As illustrated by arrow 4 in FIG. 2, session information repository 275 responds with session information resulting from the query. Session information resulting from a query can be cached in session information cache 247. Intermediary message processor 207 can use session information resulting from a query (of a session information repository or another message processor) to determine if an electronic message is associated with intermediary message processor 207.

Session information can be cached and/or queried using protocols that differ from the protocols associated with a session. Thus, a first protocol used to cache and/or query session information may differ from a second protocol that processes cached or queried session information.

After identifying session information (either local stored, remotely stored, as the result of querying another message processor, or as a result querying a session information repository) a message processor can include the session information in an electronic message. When another message processor receives the electronic message, the message processor can access the included session information. The included session information at least partially dictates how the other message processor will process the message.

It may be that a first message processor includes a portion of session information along with an associated session identifier within an electronic message. The session identifier can represent a session and the associated session information can represent how electronic messages of the session are to be processed. The first message processor may also cache the session information and cache an indication that the session information is associated with a session represented by the session identifier. When a second message processor accesses the electronic message, the second message processor can retrieve the session information and the session identifier. The second message processor can also cache the session information as well as caching an indication that session information is associated with a session represented by the session identifier.

This significantly reduces the need to include the session information in subsequent electronic messages transferred as part of the session. For example, when the second message processor receives an electronic message (e.g., from the first message processor) including the session identifier, the second message processor can access cached session information to determine how the electronic message is to be processed. Similarly, when the first message processor receives an electronic message (e.g., from the second message processor) including the session identifier, the first message processor can access cached session information to determine how the electronic message is to be processed.

Step 305 also includes a corresponding act of determining if session information is to be updated (act 303). Act 303 can include the accessing message processor determining if session information within an electronic message or session information cache is to be updated. For example, when intermediary message processor 206 accesses electronic message 230, intermediary message processor 206 can determine that session information (e.g., included in session element 232 or included in some other session element) within electronic message 230 is to be updated. Updating session information can include performing any of a number of different operations on session information, such as, for example, inserting session information into electronic message 230, removing session information from electronic message 230, modifying session information in electronic message 230, or replacing session information in electronic message 230. Session information retrieved from cached session information (e.g. session information cache 246) can be used when inserting, removing, modifying, or replacing session information in an electronic message.

When session information is structured, message processors can insert, modify, replace, and remove elements, attributes, and attribute values in accordance with a common schema. It may be determined that an element (e.g., a session element or message sequence) or attribute in an electronic message is to be removed. For example, if intermediary message processor 206 was the last message processor in a particular message sequence, intermediary message processor 206 could remove a sequence sub-element for the particular message sequence. Similarly, if it is indicated to a message processor 206 that a particular message sequence (or communication session) is expired, message processor 206 could remove a sequence sub-element for the particular message sequence.

On the other hand, it may be determined that an element or attribute is to be inserted an electronic message. For example, if distributed application 242A desires to communicate with distributed application 242B, end message processor 205 may include an element for a communication session or message sequence associated with distributed application 242B in an electronic message. In some embodiments, session information is given an XML identifier that can be used to reference the session information. When a request to insert, modify, or remove session information from an electronic message is received, the XML identifier can be used to access the session information.

It may also be that session information retrieved from an electronic message is used to update cached session information. Updating cached session information can include performing any of a number of different operations on cached session information, such as, for example, inserting session information into session information cache 246, removing session information from session information cache 246, modifying session information in session information cache 246, or replacing session information in session information cache 246. Session information retrieved from an electronic message (e.g. electronic message 230) can be used when adding, removing, modifying, or replacing cached session information.

The method 300 also includes an act routing the message (act 304). Act 304 can include the application layer (at the accessing message processor) routing the electronic message to another message processor included in a distributed system. As shown by arrows 1, 2, and 5 in FIG. 2, electronic message 230 can be routed between the message processors depicted in network architecture 200.

By appropriately configuring sequence sub-elements within session elements of electronic messages a plurality of ordered message sequences can be included within a single reliable messaging connection.

TABLE 1

| | Electronic Message | | | | | | | |
| --- | --- | --- | --- | --- | --- | --- | --- | --- |
| | 1 | 2 | 3 | 4 | 5 | 6 | 7 | 8 |
| Sub Stream S | $1^{st}$ | — | $2^{nd}$ | $3^{rd}$ | — | — | — | $4^{th}$ |
| Sub Stream T | — | $1^{st}$ | — | — | $2^{nd}$ | $3^{rd}$ | — | — |

Table 1 illustrates message sequences "Sub Stream S" and "Sub Stream T" that are associated with a reliable messaging connection at a message processor. Electronic messages 1 through 8 represent electronic messages that are received at the message processor. Appropriate sequence sub-elements can be included in electronic messages 1 through 8 to establish the order in which Sub Stream S and Sub Stream T receive electronic messages 1 through 8. For example, electronic message 1 can contain a sequence sub-element representing message sequence Sub Stream S and that electronic message 1 is the first electronic message in message sequence Sub Stream S.

Likewise, electronic message 2 can contain a sequence sub-element representing message sequence Sub Stream T and that electronic message 2 is the first electronic message in message sequence Sub Stream T. Electronic messages 3 through 8 can also include appropriate sequence sub-elements to cause electronic messages to be received by Sub Stream S and Sub Stream T in the order illustrated in Table 1. As the electronic messages 1 through 8 are received at a message processor, the message processor can cache the electronic messages. If any of the electronic messages 1 though 8 are received out of order, the message processor may refer to cached session information to appropriately reorder cached electronic messages after reception. For example, intermediary message processor 206 could use session information cached in session information cache 246 to reorder messages in a sequence including electronic message 230.

By appropriately configuring sequence sub-elements within session elements of electronic messages, an electronic message can be associated with multiple message sequences.

TABLE 2

| | Electronic Message | | | | | |
|---|---|---|---|---|---|---|
| | 11 | 12 | 13 | 14 | 15 | 16 |
| Sub Stream U | $1^{st}$ | — | $2^{nd}$ | $3^{rd}$ | — | $4^{th}$ |
| Sub Stream V | — | $1^{st}$ | — | $2^{nd}$ | $3^{rd}$ | $4^{th}$ |

Table 2 illustrates message sequences "Sub Stream U" and "Sub Stream V" that are associated with a message processor. Electronic messages 11 through 16 represent electronic messages that are received at the message processor. Electronic message 14 can contain two sequence sub-elements. A first sequence sub-element in electronic message 14 can represent message sequence Sub Stream U and that electronic message 14 is the third electronic message in message sequence Sub Stream U. A second sequence sub-element in electronic message 14 can represent Sub Stream V and that electronic message 14 is the second electronic message in message sequence Sub Stream V. Electronic message 16 can also contain two sequence sub-elements representing that electronic message 16 is the fourth message in both Sub Stream U and Sub Stream V.

By appropriately configuring sequence sub-elements within session elements of electronic messages, users can define named application specific sequences.

TABLE 3

| | Electronic Message | | | | | | | |
|---|---|---|---|---|---|---|---|---|
| | 21 | 22 | 23 | 24 | 25 | 26 | 27 | 28 |
| Sub Stream X | $1^{st}$ | — | $2^{nd}$ | $3^{rd}$ | — | $4^{th}$ | — | $5^{th}$ |
| Sub Stream Y | — | $1^{st}$ | — | $2^{nd}$ | $3^{rd}$ | $4^{th}$ | — | — |
| Customer 49C3 | $1^{st}$ | — | — | $2^{nd}$ | — | $3^{rd}$ | — | — |

Table 3 illustrates message sequences "Sub Stream X" and "Sub Stream Y" and a user-defined application sequence "Customer 49C3" that are associated with a message processor. Electronic messages 21 through 28 represent electronic messages that are received at the message processor. Electronic message 21 can contain a session sub-element representing message sequence Customer 49C3 and that electronic message 21 is the first message in message sequence Customer 49C3 (as well as a session sub-element representing that electronic message 21 is the first electronic message in message sequence Sub-Stream X). Similarly, electronic messages 24 and 26 can contain a session sub-element representing message sequence Customer 49C3 (as well as session sub-elements representing message sequences Sub Stream X and Sub Stream Y). Table 3 illustrates that the message processor does not have a sub sequence associated with electronic message 27.

Applications can define ordering predicates over message sequences to specify the order of delivery. For example, an ordering predicate may indicate that from Sub Stream A return messages regarding Customer 49C3. It may also be that an ordering predicate returns electronic messages of a particular priority in increasing order before electronic messages in other streams are returned.

Figure 5:
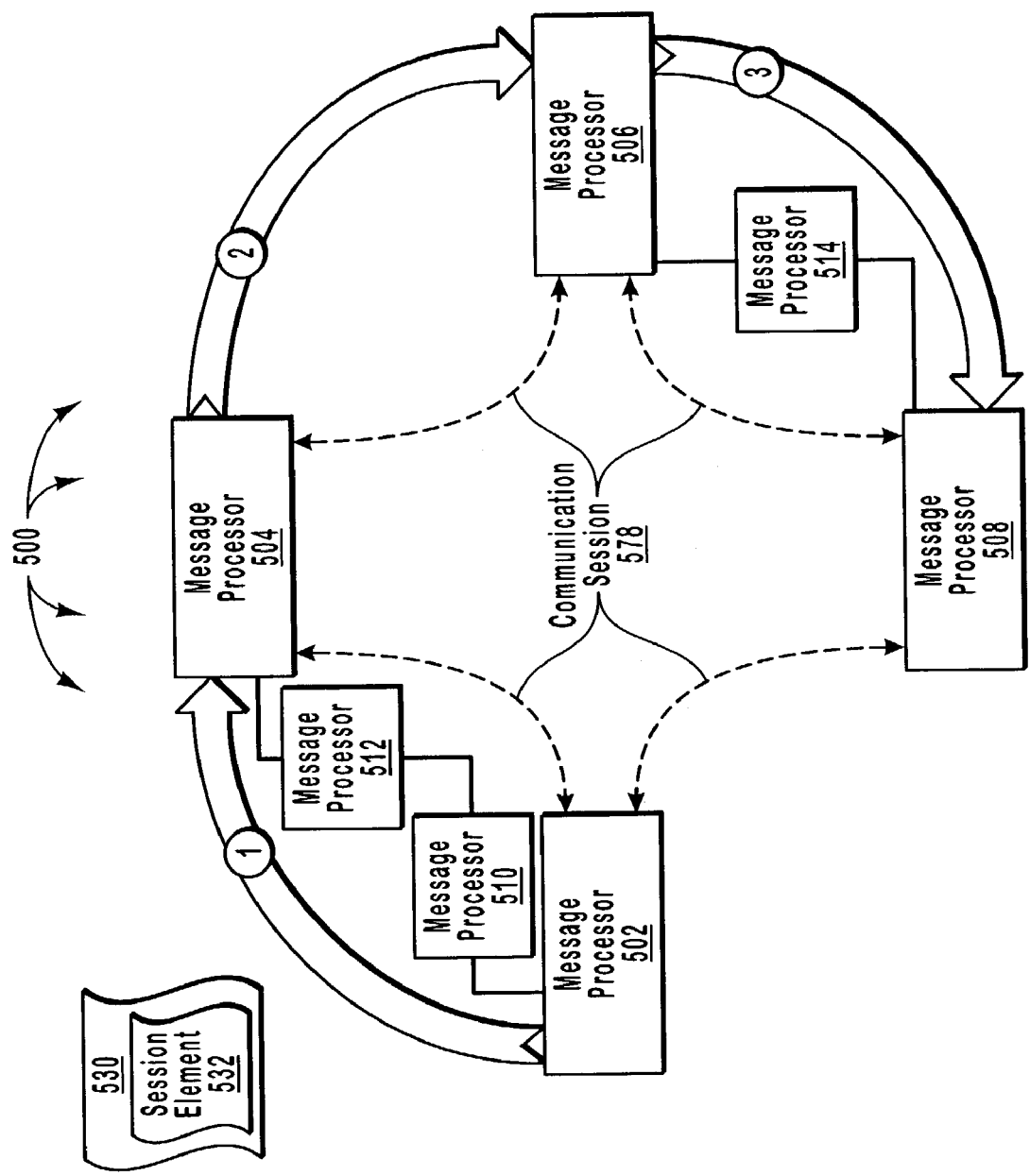
FIG. 5 illustrates an example of a network architecture that can facilitate using expressive session information to initiate a communication session between a plurality of message processors.
Figure 6:
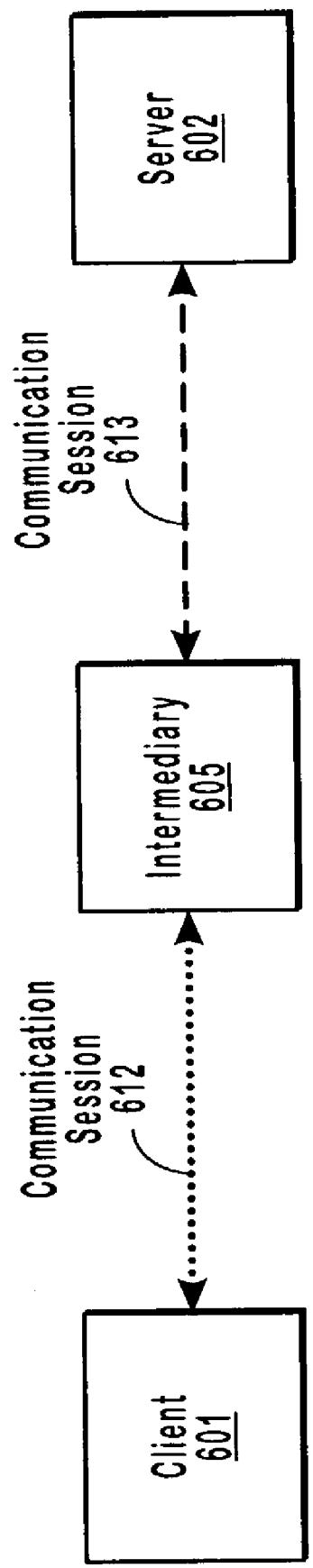
FIG. 6 is a prior art system illustrating a client, an intermediary, and a server.

It may be that a communication channel is established between three or more message processors. FIG. 5 illustrates network architecture 500 that can facilitate using expressive session information to represent a communication session between a plurality of message processors. FIG. 4 illustrates a flowchart of a method 400 for using expressive session information to initiate a communication session. The method 400 will be described with respect to the message processors depicted in network architecture 500.

Arrows 1, 2, and 3 in FIG. 5 illustrate generally that electronic message 530, which contains session element 532, is transferred between message processors 502, 504, 506, and 508 to establish communication session 578. Message processors 502, 504, 506, and 508 can cache session information included in session element 532 for use in processing subsequently received electronic messages. Also included in network architecture 500 are message processors 510, 512 and 514. Message processors 510, 512, and 514 function as routers to route message 530 between message processors 502, 504, 506, and 508. However, as message processors 510, 512, and 514 are not part of communication session 578 they may not cache session information from session element 532. Further, message processors 510, 512, and 514 may be unaware that session information is even contained in electronic message 530.

The method 400 includes an act of identifying session information (act 401). Act 401 can include a first receiving message processor (or even an initiating message processor) identifying session information for establishing a communication session with one or more other receiving message processors. For example, message processor 502 can identify session information for establishing a communication session with message processors 504, 506, and 508. It may be that a first portion of a distributed application at message processor 502 identifies session information for a communication session that is to be established (through one or more message sequences) with one or more other portions of the distributed application at message processors 504, 506, and 508. Message processor 502 can identify session information from session information that is cached at message processor 502.

Likewise, message processors 504, 506, and 508 can each identify session information for establishing a communication session with message processor 502. For example, the other portions of the distributed application can identify session information for a communication session that is to be established with the first portion of the distributed application. Session information identified at message processors 504, 506, and 508 can be combined with session information identified at message processor 502 to generate communication options, such as, for example, session identifiers and message sequences representing a communication session.

The method 400 includes an act of including identified session information in a session element (act 402). Act 402 can include a first receiving application layer (or initiating application layer) at the first receiving message processor (or initiating message processor) including the identified session information in a session element that can be processed by corresponding receiving application layers at each of the one or more other receiving message processors. For example, an application layer at message processor 502 can include identified session information within session element 532. Application layers at message processors 504, 506, and 508 can process the identified session. When session information is to be structured, message processor 502 can configure session element 532 in accordance with a schema that is accessible to message processors 502, 504, 506, and 508.

The method 400 includes an act of routing the session element to one or more receiving message processors (act 403). Act 403 can include message processor 502 routing electronic message 530, which includes the session element 532, to message processors 504, 506, and 508. Electronic message 530 can be an electronic message that was initiated at message processor 502 or that message processor 502 received from another message processor. Although electronic message 530 is illustrated as following a routing path from message processor 502, through message processor 504, through message processor 506, and to message processor 508, the routing of electronic message 530 is not important. In accordance with the principles of the present invention, electronic message 530 can be routed along a plurality of different routing paths to message processors 504, 506, and 508.

In some embodiments, the routing of session element 532 can include message processor 502 routing a plurality of electronic messages. For example, a first electronic message containing session element 532 can be routed to message processor 504, a second electronic message containing session element 532 can be routed to message processor 506, and a third electronic message containing session element 532 can be routed to message processor 508.

The method 400 includes an act of a second receiving message processor receiving the session element (act 404). Act 404 can include any of the message processors 504, 506, or 508 receiving session element 532. The method 400 includes an act of updating session information (act 405). Act 405 can include any of the message processors 504, 506, or 508 updating cached session information to indicate an association with one or more message sequences included in session element 532. For example, message processor 504 can update cached session information to indicate that a portion of a distributed application at message processor 504 is associated with a message sequence initiated by a portion of the distributed application at message processor 502. Message processors that update session information to establish an association with a message sequence included in session element 532 can each be viewed as being included in communication session 578.

It should be understood that although network architecture 500 illustrates that four message processors (message processors 502, 504, 506, and 508) are part of a communication session, the principles of the present invention are scalable to any number (either fewer or greater) of message processors. Additional message processors, such as, for example, any of message processors 510, 512, or 514, or even other message processors external to network architecture 500, can be configured to cache session information from session element 532. If one or more of these message processors updates session information to establish an association with a message sequence included in session element 532, communication session 578 can be scaled to include the additional message processors. On the other hand, when a message processor (e.g., one of message processors 504, 506, or 508) does not update session information to establish an association with a message sequence included in session element 532, communication session 578 can be scaled down to exclude the message processor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a distributed system including an accessing message processor that is communicatively connectable to one or more other message processors such that the accessing message processor and the one or more other message processors can communicate by transferring electronic messages, a method for the accessing message processor to update session information for a communication session, the method comprising:

accessing, by an application layer process running at an application layer of a communications protocol stack at the accessing message processor, a cached electronic message that includes an XML data structure contained within a SOAP envelope and that includes session information for establishing a communication session between the accessing message processor and at least one other message processor, the session information including at least one session element comprising at least one session identifier and at least one message sequence identifier, wherein the application layer comprises one of a plurality of distinct layers in the communications protocol stack that includes at least one lower protocol stack layer, and wherein the accessing message processor includes a session storage location that can be utilized to cache session information for communication sessions and includes a message storage location that can be used to cache received electronic messages;

identifying, by the application layer process from within the cached electronic message, the session information of the communication session associated with the accessing message processor, and such that the application layer process identifies the session information, including said at least one session identifier and at least one message sequence identifier, as opposed to said session information being identified at the at least one lower protocol stack layer;

determining that the accessing message processor is to update the session information cached at the accessing message processor such that the session information is updated by the application layer process of the accessing message processor rather than being updated at the at least one lower protocol stack layer of the accessing message processor, wherein said updating includes at least one of modifying, replacing, removing, or adding the session information; and routing the cached electronic message to another message processor included in the distributed system.

2. The method as recited in claim 1, wherein accessing a cached electronic message comprises accessing the SOAP envelope.

3. The method as recited in claim 1, wherein accessing a cached electronic message comprises accessing a cached electronic message containing a schema-based session element.

4. The method as recited in claim 1, wherein accessing a cached electronic message comprises accessing a cached electronic message that is associated with a plurality of message sequences.

5. The method as recited in claim 1, wherein accessing a cached electronic message comprises accessing a cached electronic message that was received from a session information repository.

6. The method as recited in claim 1, wherein identifying, from within the cached electronic message, the session information associated with the accessing message processor comprises identifying a session element that indicates another message processor is querying cached session information stored in the session storage location.

7. The method as recited in claim 1, wherein identifying, from within the cached electronic message, the session information associated with the accessing message processor comprises identifying session information that includes a structured session name.

8. The method as recited in claim 1, wherein identifying, from within the cached electronic message, the session information associated with the accessing message processor comprises identifying session information that associates a plurality of message sequences with the communication session.

9. The method as recited in claim 1, wherein identifying, from within the cached electronic message, the session information associated with the accessing message processor comprises identifying a session element that updates session information cached in the session storage location.

10. The method as recited in claim 1, wherein identifying, from within the cached electronic message, the session information associated with the accessing message processor comprises identifying a schema-based session element.

11. The method as recited in claim 10, wherein identifying a schema-based session element comprises identifying a schema-based XML session element.

12. The method as recited in claim 1, wherein identifying, from within the cached electronic message, the session information associated with the accessing message processor comprises identifying a session element that indicates the accessing message processor is associated with a plurality of message sequences represented in the cached electronic message.

13. The method as recited in claim 1, wherein identifying, from within the cached electronic message, the session information associated with the accessing message processor comprises identifying a session element that indicates the accessing message processor is associated with a plurality of communication sessions represented in the cached electronic message.

14. The method as recited in claim 1, wherein identifying, from within the cached electronic message, the session information associated with the accessing message processor comprises identifying session information that was encrypted for the message processors that are part of the communication session.

15. The method as recited in claim 1, wherein identifying, from within the cached electronic message, the session information associated with the accessing message processor comprises identifying that no session information is associated with the accessing message processor.

16. The method as recited in claim 1, wherein identifying, from within the cached electronic message, the session information associated with the accessing message processor comprises identifying a session identifier that causes the accessing message processor to retrieve cached session information from the session storage location.

17. The method as recited in claim 1, wherein determining that the accessing message processor is to update the session information cached at the accessing message processor comprises determining that the accessing message processor is to update cached session information at the session storage location wherein updating is modifying, replacing, or removing cached session information at the session storage location.

18. The method as recited in claim 1, wherein determining that the accessing message processor is to update the session information cached at the accessing message processor comprises determining that the accessing message processor is to add session information contained in the cached electronic message to the session storage location.

19. The method as recited in claim 1, wherein determining that accessing message processor is to update the session information cached at the accessing message processor comprises determining that the communication session is to be terminated.

20. The method as recited in claim 1, wherein determining that the accessing message processor is to modify the session information cached at the accessing message processor comprises determining that the accessing message processor is to update session information contained in the cached electronic message wherein updating is adding, modifying, replacing, or removing session information at the cached electronic message.

21. The method as recited in claim 1, wherein determining that the accessing message processor is to modify the session information cached at the accessing message processor comprises determining that the communication session expired.

22. The method as recited in claim 1, wherein determining that the accessing message processor is to update the session information cached at the accessing message processor comprises determining that the communication session is to be created.

23. The method as recited in claim 1, wherein determining that the accessing message processor is to update the session information cached at the accessing message processor comprises determining that the accessing message processor is to query session information from another message processor.

24. The method as recited in claim 1, wherein routing the cached electronic message to another message processor included in the distributed system comprises routing a SOAP envelope that contains XML instructions.

25. The method as recited in claim 1, wherein routing the cached electronic message to another message processor included in the distributed system comprises routing the cached electronic message to a message processor that queried session information stored in the session storage location.

26. The method as recited in claim 1, wherein routing the cached electronic message to another message processor included in the distributed system comprises terminating the cached electronic message.

27. The method as recited in claim 1, wherein routing the cached electronic message to another message processor included in the distributed system comprises routing a cached electronic message that is associated with a plurality of message sequences.

28. A method as recited in claim 1, wherein the at least one lower protocol stack is a transfer layer configured to use a TCP protocol.

29. The method of claim 1, wherein the session information includes a plurality of session elements, at least one of the of plurality of session elements being created as a name-value pair, and wherein at least one of the session elements is included in the header portion of the cached electronic message, while application data is included in a body portion of the cached electronic message.

30. A computer program product comprising one or more physical storage media having stored computer-executable instructions which when executed by a processor implement the method recited in claim 1.

31. The computer program product as recited in claim 30, further comprising:
   computer-executable instructions for caching identified session information.

32. The computer program product as recited in claim 30, wherein the one or more physical storage media comprise system memory.

* * * * *